UNITED STATES PATENT OFFICE.

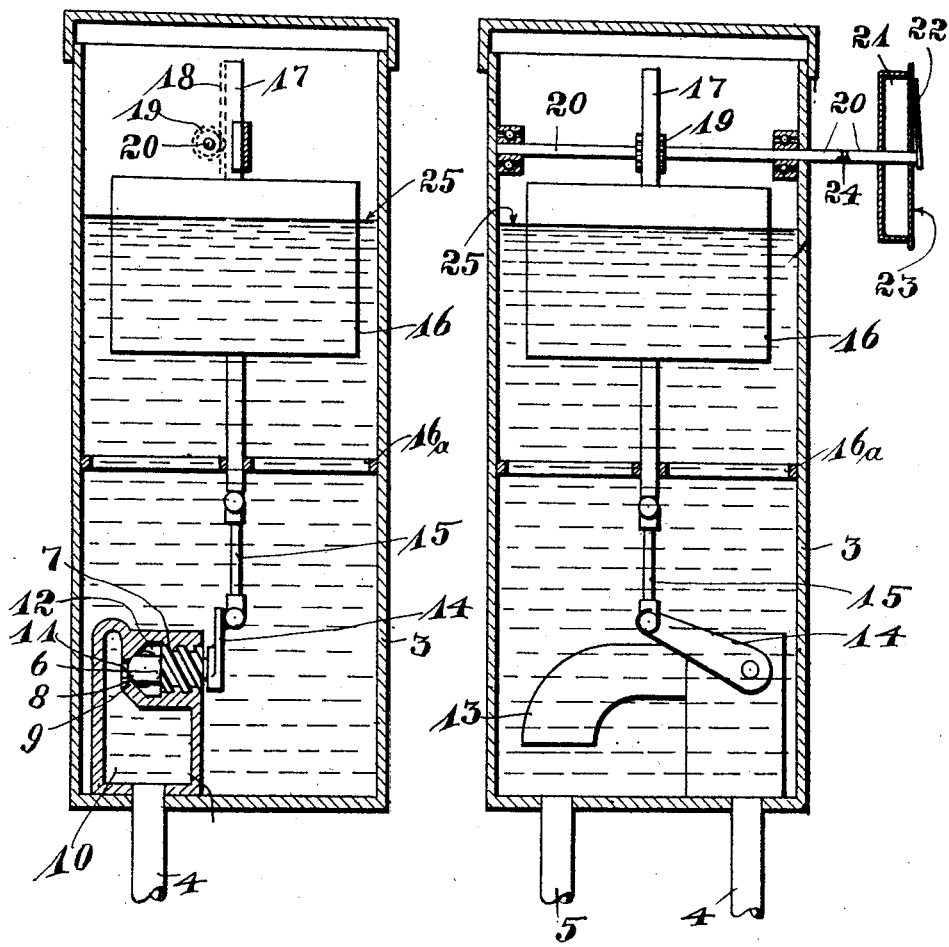

HERMAN A. ANDERSON, OF LONG BEACH, CALIFORNIA.

LIQUID-FUEL METER.

1,412,263.  Specification of Letters Patent.  Patented Apr. 11, 1922.

Application filed November 9, 1920. Serial No. 422,884.

*To all whom it may concern:*

Be it known that I, HERMAN A. ANDERSON, a citizen of the United States, residing at Long Beach, in the county of Los Angeles and State of California, have invented a new and useful Liquid-Fuel Meter, of which the following is a specification.

This invention relates to devices for allowing fluids to pass through an instrument and thereby measuring the fluids.

One of the objects of this invention is to provide indicating means for such an instrument to show the amount of fluids passing during a certain time or period, or in proportion to some other measurement.

Another object is to provide a device that will indicate the amount of liquid fuel consumed by the hour at the rate of speed at which an engine is operated.

Another object is to provide a device to be used in the controlling system of an internal combustion engine to indicate the amount of fuel consumed in relation to the delivered power.

Another object is to provide a device to be used in the controlling system of an automobile engine to indicate the amount of fuel consumed in relation to the speed at which the automobile is being operated during a certain time or period.

Other objects will appear from the following description and appended claim as well as from the accompanying drawing, in which—

Fig. 1 is a vertical midsectional view of the device.

Fig. 2 is a vertical midsectional view at about right angles to the illustration in Fig. 1.

The housing 3 is provided with an inlet connection 4 and an outlet connection 5, see Fig. 2. The inlet is controlled by the valve 6, see Fig. 1. Such a valve must naturally work or operate against the pressure in the supplying line, and, therefore, is preferably provided with a threaded portion 7 to turnably seal the end 8 of the valve stem in the valve seat 9. In this construction there is naturally a closed compartment 10, shut off from the housing by the valve 6, in the drawing this compartment is shown as of an independent construction within the housing, but it will naturally easily be understood that the smaller compartment may easily be cast within the housing so as to form one piece with the housing.

The passage 11 allows communication from the compartment 10 to the compartment 12, which in turn communicates freely with the inside of the housing 3. An elbow 13 is illustrated in Fig. 2 as forming the communication between the compartment 12 on one side and the housing 3 on the other side, but it will easily be understood that no such elbow is necessary, such a detail being only used to provide a more direct conduit for guiding and bringing the fluids from the intake 4, through the checking compartments, over to the outlet 5.

The threaded portion 7 of the valve is naturally so designed that the valve stem 6 disengages from the seat 9 by a suitable motion. A lever 14 is provided on the valve stem 6, interconnected by the rod 15, with the float 16 for actuating the valve. A spider 16ª is provided to guide the float in its vertical movement with the least possible friction, leaving most of the area of the housing free to influence the float. The upper end 17 of the float-supporting bar is provided with a rack 18 to engage with a small pinion 19. A shaft 20 is provided to transmit the motion of the float to an instrument. An instrument is indicated at 21, showing a hand 22 in front of a face plate 23, but it will, of course be understood that no specific design is necessary for such an instrument and that any other similar device may be used as long as certain indicating marks are provided by which the information can be indicated. The shaft 20 can, of course, also be extended to allow a disposing of the housing with the valve and float control at one place while the indicating part of the device can be disposed at another point, for instance the dash-board of an automobile, the shaft being therefore indicated as broken at 24.

The liquid is indicated as maintaining itself at about the line 25 in normal inoperative condition of the device. As soon as any fluid is taken from the outlet 5, the liquid naturally sinks to a lower level. Such a sinking is naturally followed by a descending of the float 16. The float presses on the lever 14 through its connecting rod 15. The lever, being mounted on the end of the valve stem 6, naturally causes by such movement a turning of the valve. The valve, since provided with the threaded portion 7, not only turns but also unscrews or moves away from the seat 9, thereby freeing the passage 11 so that new liquids can enter from the intake 4, through the compartment 10, through the passage 11, through the compartment 12 into the housing 3.

Such a descending of the float causes also a turning of the shaft 20 and thereby an indicating of the hand in relation to matter provided on the indicating face 23 of the instrument 21.

It naturally follows that a continuous taking of liquids from the housing through the outlet 5 requires a corresponding opening of the valve 6, which in turn requires and causes the float to descend to a certain lower position according to the opening of the valve. Such descending of the float is indicated by the indicating hand 22, and it naturally follows that the taking of liquids from the housing is directly indicated by the hand 22.

It will easily be understood that the indicating marks on the front face 23 can be arranged in a required and desired manner, to indicate the amount of liquid taken in accordance to the power accomplished by such used liquid, or, if used on an automobile, to indicate the amount of liquid used to the mile, or by hour, or by the hour according to the speed at which the automobile is being operated. For instance, if much hydrocarbon is necessary to run the engine of an automobile at a certain speed of the automobile, this instrument will naturally indicate the amount of gasoline used at that speed by the hour. In this manner, the instrument indicates the amount of hydrocarbon used by the hour at any moment in relation to the speed at which the automobile is being operated. In such a case the float will naturally be kept at a proportionally low point. If only a small amount of hydrocarbon is used, the float does not descend very much since the valve does not have to be opened very much to allow enough hydrocarbon to pass the valve 6, and the instrument indicates the amount of hydrocarbon used by the hour at any moment in relation to the speed at which the automobile is being operated. On going up hill or when having to draw a heavy load, the automobile naturally only makes a limited headway by hour but uses much hydrocarbon, the speedometer in such a case indicating a low speed, while the gasometer (that is a device of this kind) indicates a great amount of hydrocarbon used at the same rate of time or other similar measure. The indicating marks can, of course, be arranged to suit the conditions or requirements in different cases for different purposes without departing from the principle of this invention.

The indicating marks on such instruments can naturally be made and arranged to indicate the volume or amount of liquids passing through the device in relation or as computed to time, or horse-power developed by the engine which consumes the liquids, or mile, or other established facts or effects or other indicated measurements in relation to which such data is desirable. The face of the indicating instrument is not shown in the drawing, but it will easily be understood that such marks can be provided on such a face to indicate exactly the volume of used liquids in relation to any of such measures.

Having thus described my invention, I claim:

In a liquid fuel meter, a housing having inlet and outlet passages, a valve body having a passage therethrough disposed in the housing to control the passages in the housing, a valve stem turnably disposed in the valve body to control the passage in the body, a float in the housing, a rack on the float projecting upwardly, means operative by a stem projecting downwardly from the float, guiding means in the housing for the rack and the stem of the float in a normally vertical alignment, a crank on the valve stem, a connecting rod between the float-stem and the crank of the valve, an indicator having a shaft extending into the housing, and a gear on the shaft to engage with the rack on the float to actuate the indicator.

In testimony that I claim the foregoing as my invention I have signed my name in the presence of two subscribing witnesses.

HERMAN A. ANDERSON.

Witnesses:
OTTO H. KRUEGER,
JESSIE A. MANOCK.